United States Patent
Li

(10) Patent No.: US 11,630,595 B2
(45) Date of Patent: Apr. 18, 2023

(54) METHODS AND SYSTEMS OF EFFICIENTLY STORING DATA

(71) Applicant: ALIBABA GROUP HOLDING LIMITED, Grand Cayman (KY)

(72) Inventor: Shu Li, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 159 days.

(21) Appl. No.: 16/805,591

(22) Filed: Feb. 28, 2020

(65) Prior Publication Data

US 2020/0310668 A1 Oct. 1, 2020

Related U.S. Application Data

(60) Provisional application No. 62/824,992, filed on Mar. 27, 2019.

(51) Int. Cl.
*G06F 3/06* (2006.01)

(52) U.S. Cl.
CPC .......... *G06F 3/0644* (2013.01); *G06F 3/0604* (2013.01); *G06F 3/0656* (2013.01); *G06F 3/0683* (2013.01)

(58) Field of Classification Search
CPC .... G06F 3/0644; G06F 3/0656; G06F 3/0683; G06F 3/0604; G06F 3/0665; G06F 3/0679; G06F 3/064; G06F 3/0643; G06F 3/067
See application file for complete search history.

(56) References Cited

U.S. PATENT DOCUMENTS

| | | | |
|---|---|---|---|
| 8,176,233 B1 * | 5/2012 | Karamcheti | G06F 12/109 711/103 |
| 10,635,356 B2 * | 4/2020 | Ngu | G06F 3/0604 |
| 2016/0147671 A1 * | 5/2016 | Vishne | G06F 12/12 711/135 |

* cited by examiner

*Primary Examiner* — David Yi
*Assistant Examiner* — Alan Otto
(74) *Attorney, Agent, or Firm* — Finnegan, Henderson, Farabow, Garrett & Dunner, LLP

(57) ABSTRACT

The present disclosure provides methods, systems, and non-transitory computer readable media for efficiently storing data. The methods include segmenting a parcel of data into one or more data chunks according to a physical block size of the secondary storage unit, wherein the one or more data chunks include a partial data chunk and zero or more full data chunks; sending each full data chunk of the zero or more full data chunks to the secondary storage unit to be written to a selected physical block of the secondary storage unit; collecting, in a collection buffer, the current partial data chunk and at least another partial data chunk; and sending a combination of the current partial data chunk and a subset of the plurality of other partial data chunks to the secondary storage unit to be written to a selected physical block of the secondary storage unit, wherein said combination fills substantially all of a physical-block-sized data chunk.

18 Claims, 10 Drawing Sheets ately only, and are not restrictive of the invention,
METHODS AND SYSTEMS OF EFFICIENTLY STORING DATA

CROSS-REFERENCE TO RELATED APPLICATION

This disclosure claims the benefit of priority to U.S. Provisional Patent Application No. 62/824,992, filed on Mar. 27, 2019, which is incorporated herein by reference in its entirety.

TECHNICAL FIELD

The present disclosure generally relates to data storage, and more particularly, to methods, systems, and non-transitory computer readable media for efficiently storing data.

BACKGROUND

All modern-day computers have some form of secondary storage for long-term storage of data. Traditionally, hard disk drives (HDDs) were used for this purpose. Increasingly, however, computer systems are turning to solid state drives (SSDs) as their secondary storage unit. SSDs have many superior characteristics compared to HDDs, most prominently having vastly lower latency and vastly greater transfer speed. To take full advantage of the lower latency and higher speed, however, metadata recording various mappings, such as from logical block address (LBA) to physical block address (PBA), may be stored in random access memory (RAM) for fast access. This results in significant usage of the system's dynamic random-access memory (DRAM) capacity, reducing system performance and increasing system cost.

SUMMARY OF THE DISCLOSURE

The embodiments of the present disclosure provide methods efficiently storing data. The methods include segmenting a parcel of data into one or more data chunks according to a physical block size of the secondary storage unit, wherein the one or more data chunks include a partial data chunk and zero or more full data chunks; sending each full data chunk of the zero or more full data chunks to the secondary storage unit to be written to a selected physical block of the secondary storage unit; collecting, in a collection buffer, the current partial data chunk and at least another partial data chunk; and sending a combination of the current partial data chunk and a subset of the plurality of other partial data chunks to the secondary storage unit to be written to a selected physical block of the secondary storage unit, wherein said combination fills substantially all of a physical-block-sized data chunk.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that the foregoing general description and the following detailed description are exemplary and explanatory only, and are not restrictive of the invention, as claimed.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
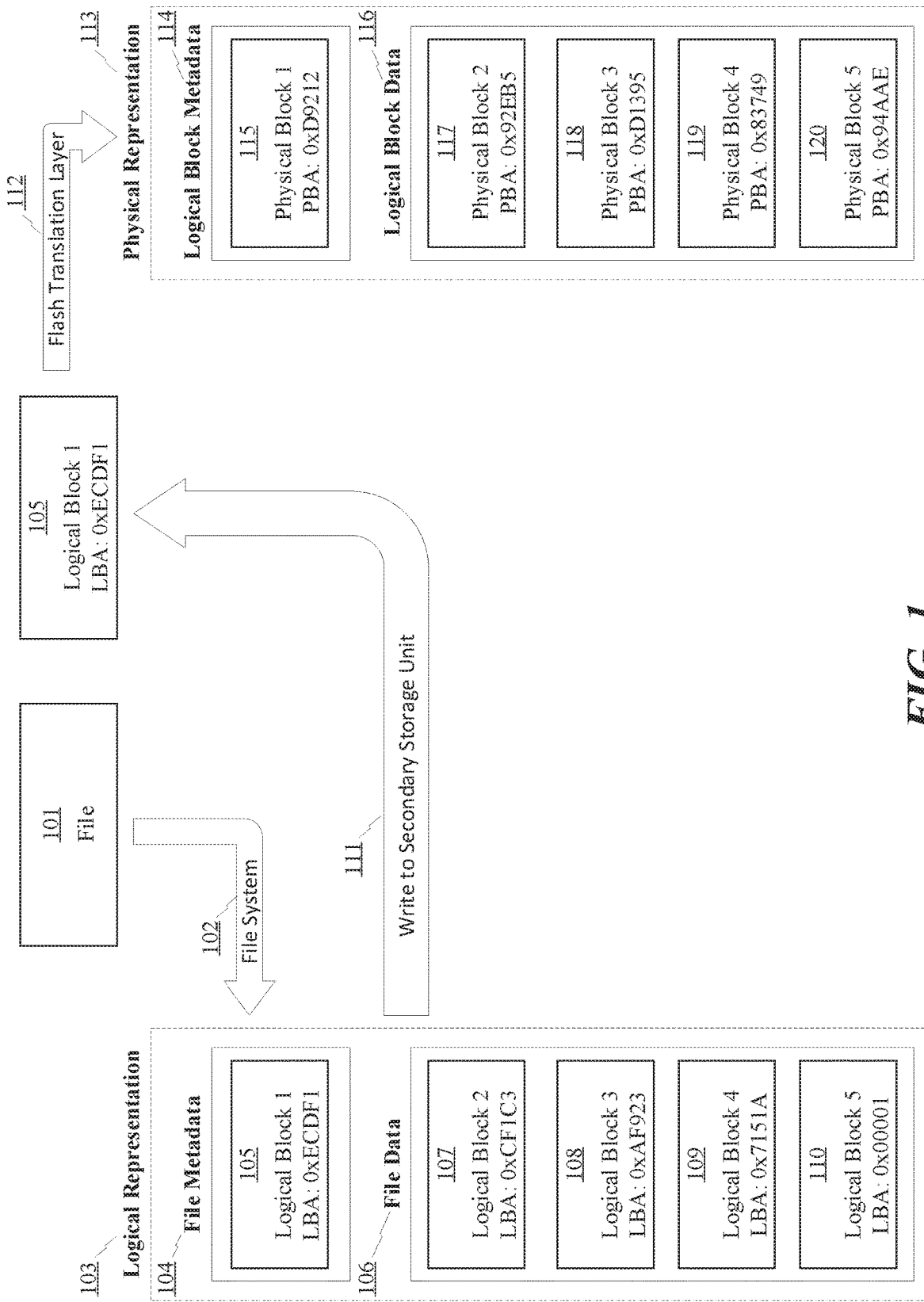
FIG. 1 illustrates a schematic diagram of the two-stage mapping performed on a file by a traditional file system and secondary storage unit.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Modern day computers are based on the Von Neuman architecture. As such, broadly speaking, the main components of a modern-day computer can be conceptualized as two components: something to process data, called a processing unit, and something to store data, called a primary storage unit. The processing unit (e.g., CPU) fetches instructions to be executed and data to be used from the primary storage unit (e.g., RAM), performs the requested calculations, and writes the data back to the primary storage unit. Thus, data is both fetched from and written to the primary storage unit, in some cases after every instruction cycle. This means that the speed at which the processing unit can read from and write to the primary storage unit can be important to system performance. Should the speed be insufficient, moving data back and form becomes a bottleneck on system performance. This bottleneck is called the Von Neumann bottleneck.

Thus, high speed and low latency are factors in choosing an appropriate technology to use in the primary storage unit. Modern day systems typically use DRAM. DRAM can transfer data at dozens of GB/s with latency of only a few nanoseconds. However, in maximizing speed and response time, there can be a tradeoff. DRAM has three drawbacks. DRAM has relatively low density in terms of amount of data stored, in both absolute and relative measures. DRAM has a much lower ratio of data per unit size than other storage technologies and would take up an unwieldy amount of space to meet current data storage needs. DRAM is also significantly more expensive than other storage media on a price per gigabyte basis. Finally, and most importantly, DRAM is volatile, which means it does not retain data if power is lost. Together, these three factors make DRAM not as suitable for long-term storage of data. These same limitations are shared by most other technologies that possess the speeds and latency needed for a primary storage device.

Thus, in addition to having a processing unit and a primary storage unit, modern-day computers also have a secondary storage unit. What differentiates primary and secondary storage is that the processing unit has direct access to data in the primary storage unit, but not the secondary storage unit. Rather, to access data in the secondary storage unit, the data from the second storage unit is first transferred to the primary storage unit. This forms a hierarchy of storage, where data is moved from the secondary storage unit (non-volatile, large capacity, high latency, low bandwidth) to the primary storage unit (volatile, small capacity, low latency, high bandwidth) to make the data available to process. The data is then transferred from the primary storage unit to the processor, perhaps several times, before the data is finally transferred back to the secondary storage unit. Thus, like the link between the processing unit and the primary storage unit, the speed and response time of the link between the primary storage unit and the secondary storage unit assists with system performance. Should its speed and responsiveness prove insufficient, moving data back and forth between the memory unit and secondary storage unit can also become a bottleneck on system performance.

Traditionally, the secondary storage unit in a computer system was HDD. HDDs are electromechanical devices, which store data by manipulating the magnetic field of small portions of a rapidly rotating disk composed of ferromagnetic material. But HDDs have several limitations that make them less favored in modern day systems. In particular, the transfer speeds of HDDs are largely stagnated. The transfer speed of an HDD is largely determined by the speed of the rotating disk, which begins to face physical limitations above a certain number of rotations per second (e.g., the rotating disk experiences mechanical failure and fragments). Having largely reached the current limits of angular velocity sustainable by the rotating disk, HDD speeds have mostly plateaued. However, CPU's did not face a similar limitation. As the amount of data accessed continued to increase, HDD speeds increasingly became a bottleneck on system performance. This led to the search for and eventually introduction of a new memory storage technology.

The storage technology ultimate chosen was flash memory. Flash storage is composed of circuitry, principally logic gates composed of transistors. Since flash storage stores data via circuitry, flash storage is a solid-state storage technology, a category for storage technology that doesn't have (mechanically) moving components. A solid-state based device has advantages over electromechanical devices such as HDDs, because solid-state devices does not face the physical limitations or increased chances of failure typically imposed by using mechanical movements. Flash storage is faster, more reliable, and more resistant to physical shock. As its cost-per-gigabyte has fallen, flash storage has become increasingly prevalent, being the underlying technology of flash drives, SD cards, the non-volatile storage unit of smartphones and tablets, among others. And in the last decade, flash storage has become increasingly prominent in PCs and servers in the form of SSDs.

SSDs are, in common usage, secondary storage units based on flash technology. Technically referring to any secondary storage unit that doesn't involve mechanically moving components, SSDs are almost exclusively made using flash technology. As such, SSDs do not face the mechanical limitations encountered by HDDs. SSDs have many of the same advantages over HDDs as flash storage such as having significantly higher speeds and much lower latencies. However, SSDs are not without their drawbacks. Principle among the drawbacks of SSDs are their relatively lower storage density and their relatively higher cost-per-gigabyte. Additionally, the way data is processed and stored on many computer systems can involve significant usage of primary storage (e.g., RAM) to take full advantage of the benefits of SSDs. These two constraints make managing the way data is stored on an SSD important, for both system performance and for system cost.

As just suggested, modern day computer systems do not simply store data onto the secondary storage unit. Rather, there is a complex hierarchy that data undergoes in between the data as it is presented (the logical representation) and the way it is physically stored (the physical representation). While the exact details vary between computer systems, the simplified view is that there are two distinct mappings between the logical representation of data and its corresponding physical representation. Thus, there are three distinct layers: the logical representation of data, an intermediate operating system (OS) representation, and then the ultimate physical representation.

Specifically, modern day computer systems can be thought of as three principle components: the physical components making up the system (e.g., the hardware), the programs being run on the system (e.g., the applications), and a special program that manages the hardware and acts as an intermediary for the applications (e.g., the OS). The benefit of the OS is that applications are relieved from needing to know about each other or about the details of the hardware the applications are running on. Rather, the OS abstracts away these details, simplifying the creation and complexity of an application. For example, one specific way that an OS acts as an intermediary between hardware and applications is by providing a file system.

The main function of a file system is to relieve applications from needing to manage the low-level structuring details necessary to properly keep track of data stored on a secondary storage unit. Rather, the file system enables applications to work with logical groupings of data, called files. This view, where data is represented as files, is the logical representation of data, where files are treated as the fundamental unit of data. However, the logical representation is essentially an illusion, as files are not what are actually stored on the secondary storage unit. Rather, the file system converts each file into one or more, usually fixed size, chunks of data called logical blocks. This is the intermediate representation of data. The mapping between a file and the logical blocks is broken down and is maintained in metadata for that file (which itself is stored). To the OS—or the file system subcomponent of the OS—logical blocks are the fundamental unit of data that are acted on and which are stored on the secondary storage unit.. Whenever an application requests to read data from or write data to a file, the file system uses the metadata associated with the file to map the read/write operation to the appropriate logical blocks. The file system then sends the data to the secondary storage unit and, if necessary, performs the reverse mapping (data block to file) for any data received in response.

While using logical mapping to abstract between files and the underlying mechanics of how data is accessed and manipulated provides several advantages, such as allowing files to be of arbitrary size, the logical mapping performed by the file system also has disadvantages. The primary disadvantage is the need to maintain metadata recording the mapping between a file and its corresponding logical blocks. The metadata, which isn't insubstantial, is stored along with the actual data, reducing the storage capacity of the secondary storage unit available to an application. Additionally, for every input/output (TO) operation an application performs (e.g., reading data from or writing data to the secondary storage unit) results in a corresponding mapping operation being performed. This increases the latency of IO operations and effectively requires the metadata to be kept in the primary storage unit (e.g., RAM) to minimize the delay. This, of course, reduces the RAM available to the application, and thus reduces system performance. It is thus important to manage the specifics of the mapping performed by the file system to minimize these tradeoffs.

However, there is a second mapping that typically occurs on many secondary storage units, especially SSDs. What happens on these secondary storage units is that, once a logical block is received by the unit, the unit performs a second, internal mapping. Specifically, the storage controller of the secondary storage unit, or a subcomponent (called the flash translation layer on SSDs), performs a function like that described for the file system above. That is, the storage controller converts the incoming logical blocks into chunks of data called physical blocks, which are then stored on the actual, physical hardware of the secondary storage unit. This is the physical representation of data, where physical blocks are treated as the fundamental unit of data. The secondary storage unit maintains metadata recording the mapping between logical blocks and their corresponding physical blocks, which is also stored on the physical hardware. Whenever the filesystem or OS requests to read from or write to a data block, the secondary storage unit uses the metadata associated with the logical block to map the read/write operation to the appropriate physical blocks.

FIG. 1 is a schematic diagram illustrating a basic overview of the mappings typically performed on a file. According to FIG. 1, a file 101 is mapped by a file system 102 into a logical representation 103. Typically, the logical representation 103 of file 101 is composed of two groups: a group of logical blocks containing the file data 106 of file 101 and a group of logical blocks containing the metadata 104 recording how the group of logical blocks 106 map to file 101. As shown here, logical block 105 contains file metadata 104 for file 101 and logical blocks 107, 108, 109, and 110 contain the file data 106 for file 101. Typically, file metadata 104 includes the logical block addresses (LBAs) of each logical block storing file data 106 and possibly including an offset value into each logical block. Note that, in general, the file metadata 104 and file data 106 can include one or more logical blocks, or even use the same logical block.

File system 102 can write each logical block to a secondary storage unit 111, where a second mapping is performed by the flash translation layer 112 of the secondary storage unit. Illustrated as logical block 105, flash translation layer 112 maps logical block 105 into physical representation 113. Typically, the physical representation 113 is composed of two groups: a group of physical blocks 116 containing the contents of logical block 105 and a group of physical blocks 114 containing the metadata recording how the group of physical blocks 116 map to logical block 105. As shown here, physical block 115 contains the logical block metadata 114 for logical block 105 and physical blocks 117, 118, 119, and 120 contain the data 116 for logical block 105. Typically, the metadata 114 includes the physical block addresses (PBA) of each logical block in logical block group 116 and possibly include an offset value into each logical block. Note that, in general, the logical block metadata 114 and logical block data 116 can include one or more physical blocks, or even use the same physical block.

Figure 2:
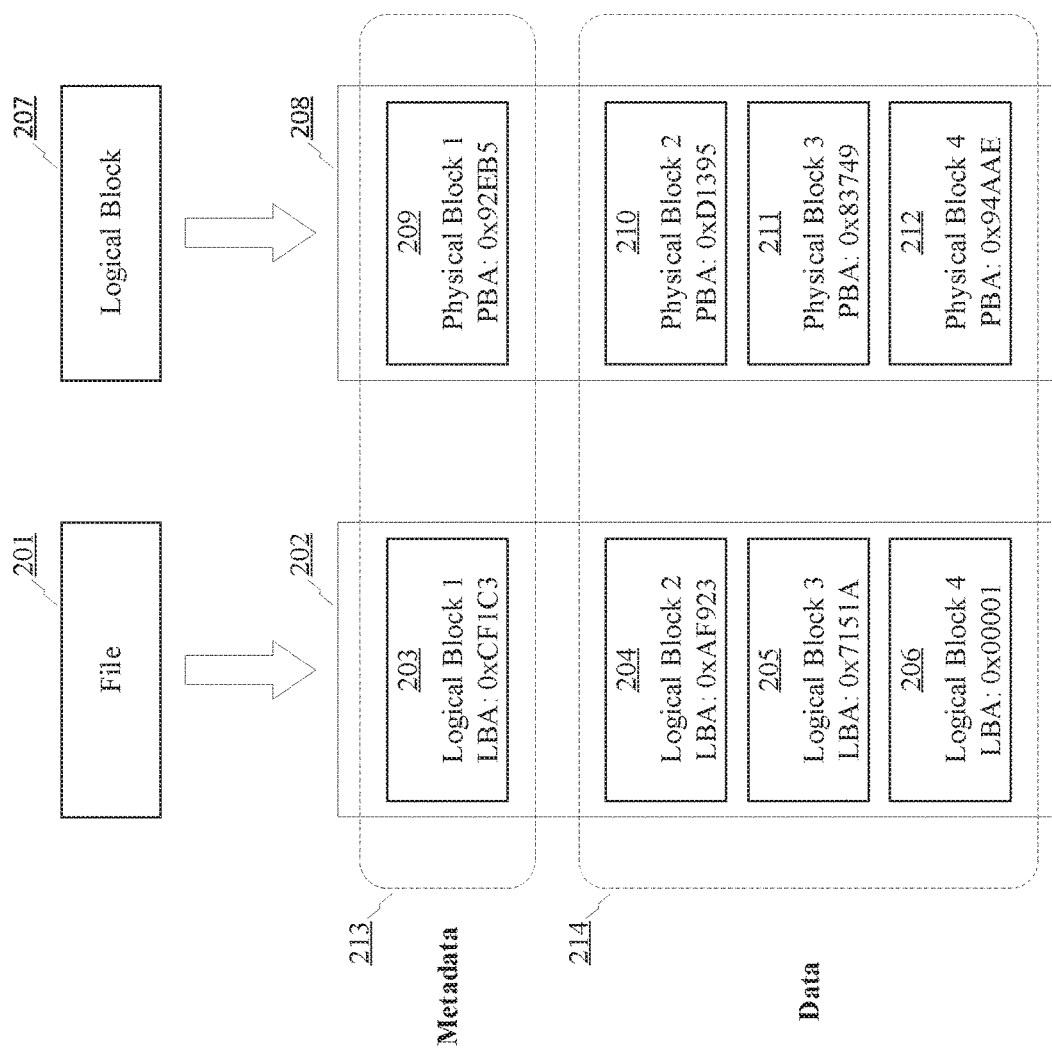
FIG. 2 illustrates and compares the logical mapping of a file to logical blocks and the physical mapping of a logical block to physical block.

FIG. 2 illustrates the similarities between the two-stage mappings of traditional computer systems. FIG. 2 shows how a file 201 is mapped to logical blocks (shown as 203, 204, 205, and 206) via the logical file system 202 and, similarly, how a logical block 207 is mapped to physical blocks (shown as 209, 210, 211, and 212) via the storage controller 208 of the secondary storage unit. FIG. 2 also shows how both the mapping of a file 201 to logical blocks and the mapping of a logical block 207 to physical blocks can be broken into data 220 and metadata 219 recording the mapping.

Figure 3:
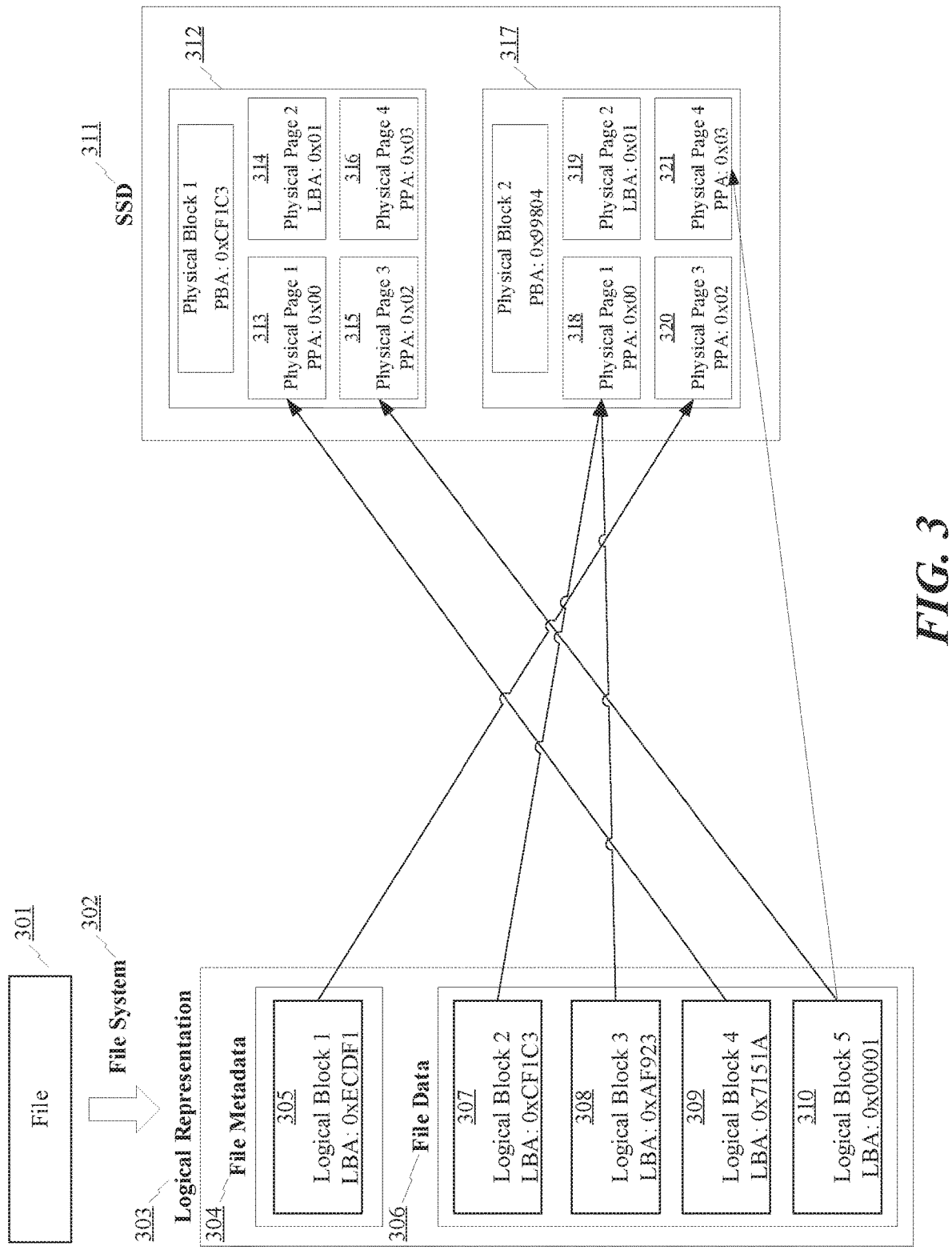
FIG. 3 illustrates a schematic diagram of the two-stage mapping performed on a file by a traditional file system and secondary storage unit, when the secondary storage unit is an SSD.

FIG. 3 is a schematic diagram illustrating a basic overview of the two-stage mapping performed on a file when the secondary storage unit is an SSD. According to FIG. 3, file 301 is mapped via file system 302 into a logical representation 303. The logical representation is, in general, composed of multiple logical blocks. Here the logical representation 303 is composed of logical blocks 305, 307, 308, 309, and 310. The logical blocks are divided into two groups: a group 306 containing the data of file 301 and a group 304 containing the metadata recording how the logical blocks of group 306 map to file 301. FIG. 3 then shows how each logical block 305, 307, 308, 309, and 310 are mapped onto a physical page of a physical block of SSD 311. Taking logical block 305 as an example, FIG. 3 shows how logical block 305 is mapped to physical page 320, which is part of physical block 317.

The reasons that secondary storage units perform this second, internal mapping, in general, is to relieve the OS from having to know about the quirks and specifics of the internal structure and characteristics of the secondary storage unit. Almost every secondary storage unit is designed to present a basic set of primitive operations (such as READ or WRITE) no matter the underlying technology or implementation characteristics. The OS then can utilize the provided generic IO operations to use the secondary storage unit. The storage controller then handles the details of converting between the generic IO operations and the specific details of the secondary storage unit's internal physical hardware, including the specifics of the underlying storage technology and any manufacturer specific quirks.

However, having two mappings, one by the file system and another by the storage controller of the secondary storage unit, is inefficient. A two-stage mapping requires that every IO operation (such as READ or WRITE) to the secondary storage unit be mapped twice, once by the file system and then once by the storage controller, which increases the latency of the IO operations. A two-stage mapping also ties up both resources of the host system and of the attached secondary storage unit. The host devotes RAM space to maintain the metadata in primary storage and devotes processing unit time to handle the necessary calculations. Similarly, the storage controller also maintains metadata for its mapping in some fast memory cache, typically DRAM, and utilizes its internal processing units to handle the mappings. Adding the DRAM and other components necessary for the mapping increases the price of secondary storage unit and reduces their speed and capacity to respond to IO requests.

Thus, avoiding the two-stage mapping can help avoid inefficiencies. Since the OS and file system would be difficult to outsource to the secondary storage unit, the mapping functions performed by the secondary storage unit (through its storage controller) should be consolidated into the functionality of the file system. However, consolidating the mapping functions performed by the secondary storage unit into the file system is non-trivial, as it then requires the filesystem/OS to manage the low-level details of the secondary storage unit which the OS is storing data on. Consolidating the mapping performed by a secondary storage unit into the functionality of the file system is a particularly complex undertaking for SSDs, which have several characteristics and functions that are managed in order to keep the SSDs functional. Some of these important functions are wear leveling, block re-mapping, garbage collection, and efficiently managing data allocation given the read/write characteristics.

Consolidating the mappings typically performed by the storage controllers of the secondary storage unit into the file system also has other additional benefits. The fundamental (smallest) unit of storage in a secondary storage unit is traditionally called a physical block. Since a physical block is the smallest amount of data that may be stored, every READ and WRITE operation to a secondary storage unit is read from some multiple of physical blocks or written to some multiple of physical blocks. As discussed above, however, in a traditional file system, the fundamental (smallest) unit of storage is a logical block. Thus, a traditional file system reads data from and writes data to a secondary storage unit in multiples of logical blocks.

The mismatch in size between logical blocks and physical blocks can lead to inefficiencies. Specifically, whenever the size of a logical block is not the same size as a physical block, there is waste of both storage capacity and data transfer speed. The inefficiency caused by a size mismatch is particularly inefficient whenever the logical block is significantly smaller than the physical block size. The greater inefficiency caused by the logical block being smaller than the physical block size is due to the secondary storage unit usually only reading and writing multiples of its physical block size. Thus, when writing data, the secondary storage unit has to waste part of a physical block, which reduces storage capacity, or store multiple logical blocks on one physical block, which increases complexity. Additionally, no matter which of these strategies is used, IO bandwidth is wasted. In the case of the logical block size being smaller than the physical block size, IO bandwidth is wasted because the secondary storage unit reads an entire physical block and then drops the additional data. And when a logical block size is bigger than the physical block size, so long as the logical block size is not a perfect integer multiple of the physical block size, the secondary storage unit again has to read a logical block (typically at the end), which contains additional data that may be dropped. Since the data is read regardless, having the secondary storage unit drop the additional data, rather than using it, wastes bandwidth and capacity.

Figure 4:
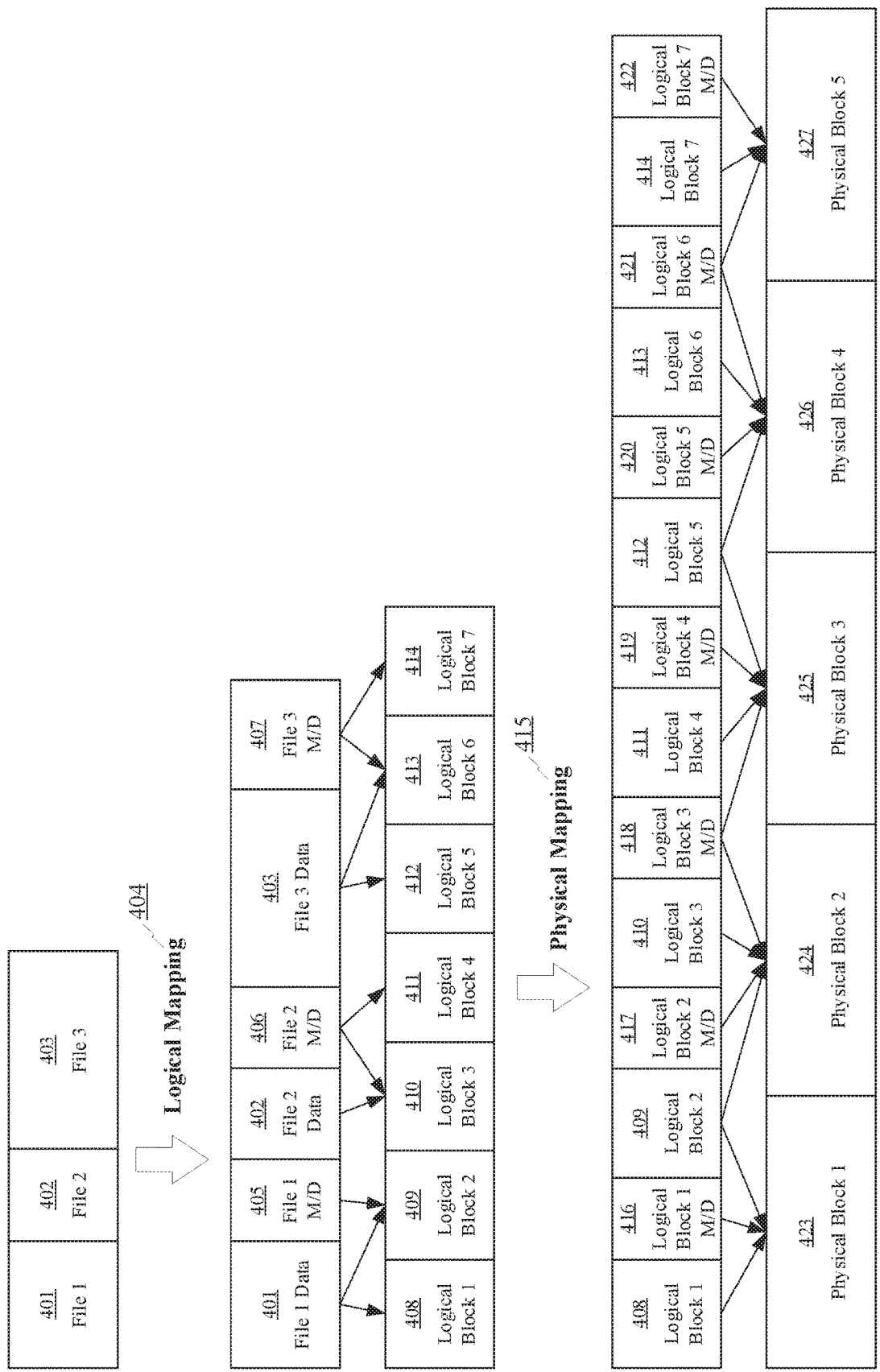
FIG. 4 illustrates how a two-stage mapping is less efficient in terms of storage utilization due to the extra metadata overhead a two-stage mapping incurs.

FIG. 4 illustrates the waste of storage capacity that occurs by having a two-stage mapping. Specifically, FIG. 4 shows how, when files are mapped into logical blocks with logical mapping 404, extra data in the form of metadata is needed. FIG. 4 then also shows how, when logical blocks are mapped into physical blocks with physical mapping 415, yet more metadata is needed to record physical mapping 415, including metadata recording the mapping of the first metadata. Taking file 401 as an example, FIG. 4 shows that file 401 is first mapped with logical mapping 404 to logical blocks 408 and 409, that metadata (M/D) 405 corresponding to file 401 and recording the logical mapping 404 of file data 401 to logical blocks 408 and 409. Metadata 405 is then also mapped to logical block 409. Similar steps are taken for files 402 and 403, in which file 402 is mapped to logical block 410 and file 403 is mapped to logical blocks 412 and 413. Metadata 406 and 407 is created recording these two mappings, which is then stored in logical blocks 410 and 411, for metadata 406, and in logical block 413 and 414, for metadata 407.

After the files are mapped to logical blocks in logical mapping 404, physical mapping 415 can occur where logical blocks are mapped to physical blocks. For example, FIG. 4 shows that logical block 408 is mapped to physical block 423, that metadata 416 corresponding to logical block 408 and recording the physical mapping 415 of logical block 408 to physical block 423 is created, and that metadata 416 is then also mapped to physical block 423. Similar steps are taken for logical blocks 408-414, which are also mapped to physical blocks 423-427. Metadata 417-422 recording these mappings are created and are also mapped to physical blocks 423-427. FIG. 4 also illustrates the possibility of size discrepancy between logical blocks and physical blocks.

While the inefficiency of having a difference between logical block size and physical block size is broadly true of all secondary storage units, the inefficiency is particularly problematic for SSDs. The greater inefficiency comes about because the size of physical blocks in SSDs are often much larger than the physical blocks of HDDs (called sectors) and are thus often much larger than the size of the OS/file system's logical blocks. The large size of an SSD's physical blocks are caused by the limitations of the NAND flash architecture SSDs are based on. As a basic overview, SSDs are made using floating gate transistors, strung together in strings. Strings are then laid next to each other to form two dimensional matrixes of floating gate transistors, referred to here as SSD blocks. Running transverse across the strings of a block (so hitting every string), is called an SSD page, and an SSD page is the minimum unit that can be read from and written to on an SSD.

Figure 5:
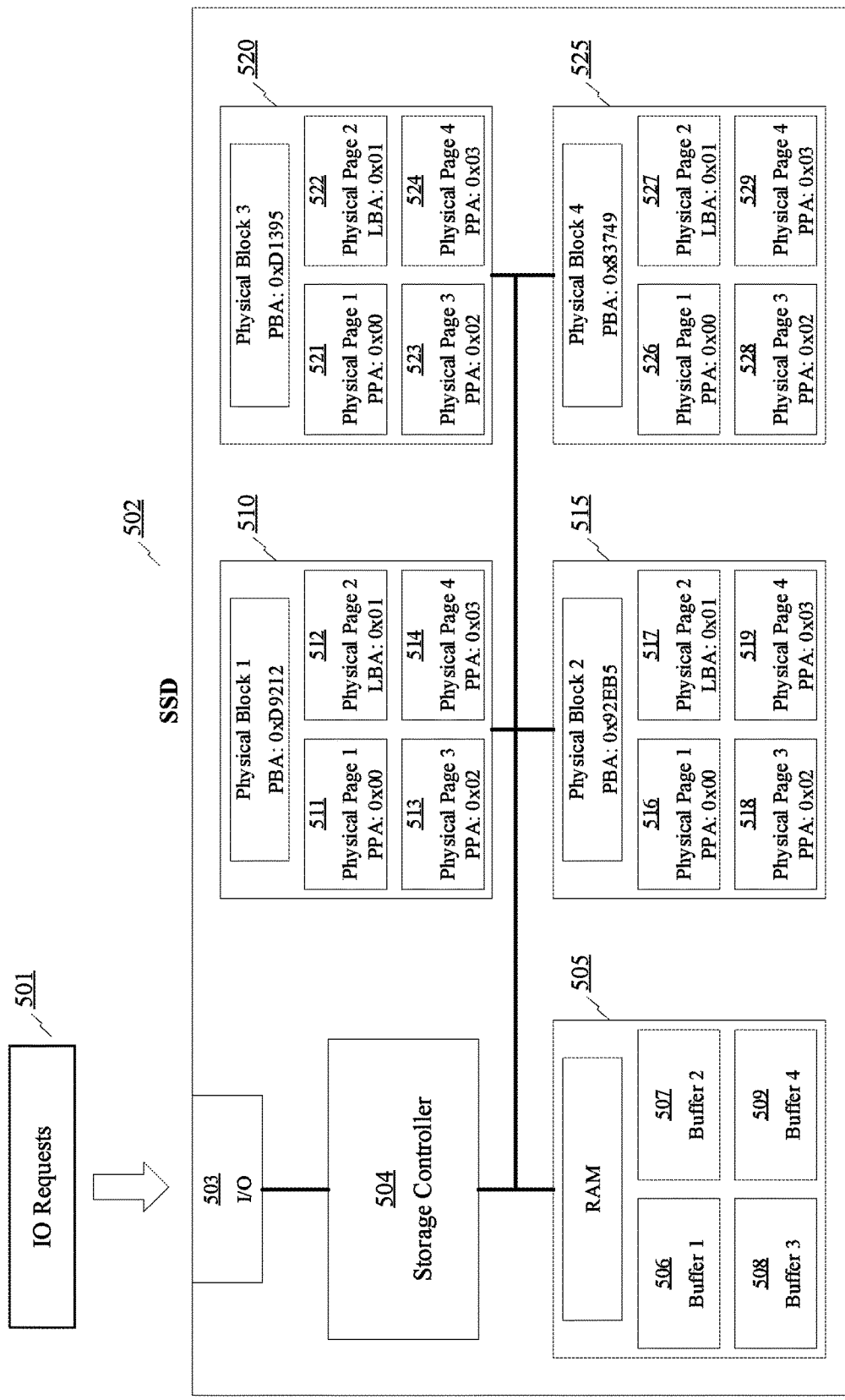
FIG. 5 is a schematic of a simplified internal structure of an SSD, according to some embodiments of the present disclosure.

FIG. 5 is a simplified schematic illustrating the basic layout of an SSD. Specifically, FIG. 5 shows how an SSD is composed of an I/O interface 503 through which the SSD communicates to the host system. Connected to the I/O interface 503 is the storage controller 504, which contains processors that control the functionality of the SSD. Storage controller 504 is connected to RAM 505, which contains multiple buffers, shown here as buffers 506, 507, 508, and 509. Storage controller 504 is then shown as being connected to physical blocks 510, 515, 520, and 525. As shown by physical block 510, each physical block has a physical block address (PBA), which uniquely identifies the physical block. Also shown by physical block 510 is that each physical block is made up of physical pages, which, for physical block 510, are physical pages 511, 512, 513, and 514. Each page also has its own physical page address (PPA), which is unique within its block. Together, the physical block address along with the physical page address uniquely identifies a page—analogous to combining a 7-digit phone number with its area code. Omitted from FIG. 5 are planes of blocks. In an actual SSD, a storage controller is connected no to physical blocks, but to planes, each of which is composed of physical blocks.

Figure 6:
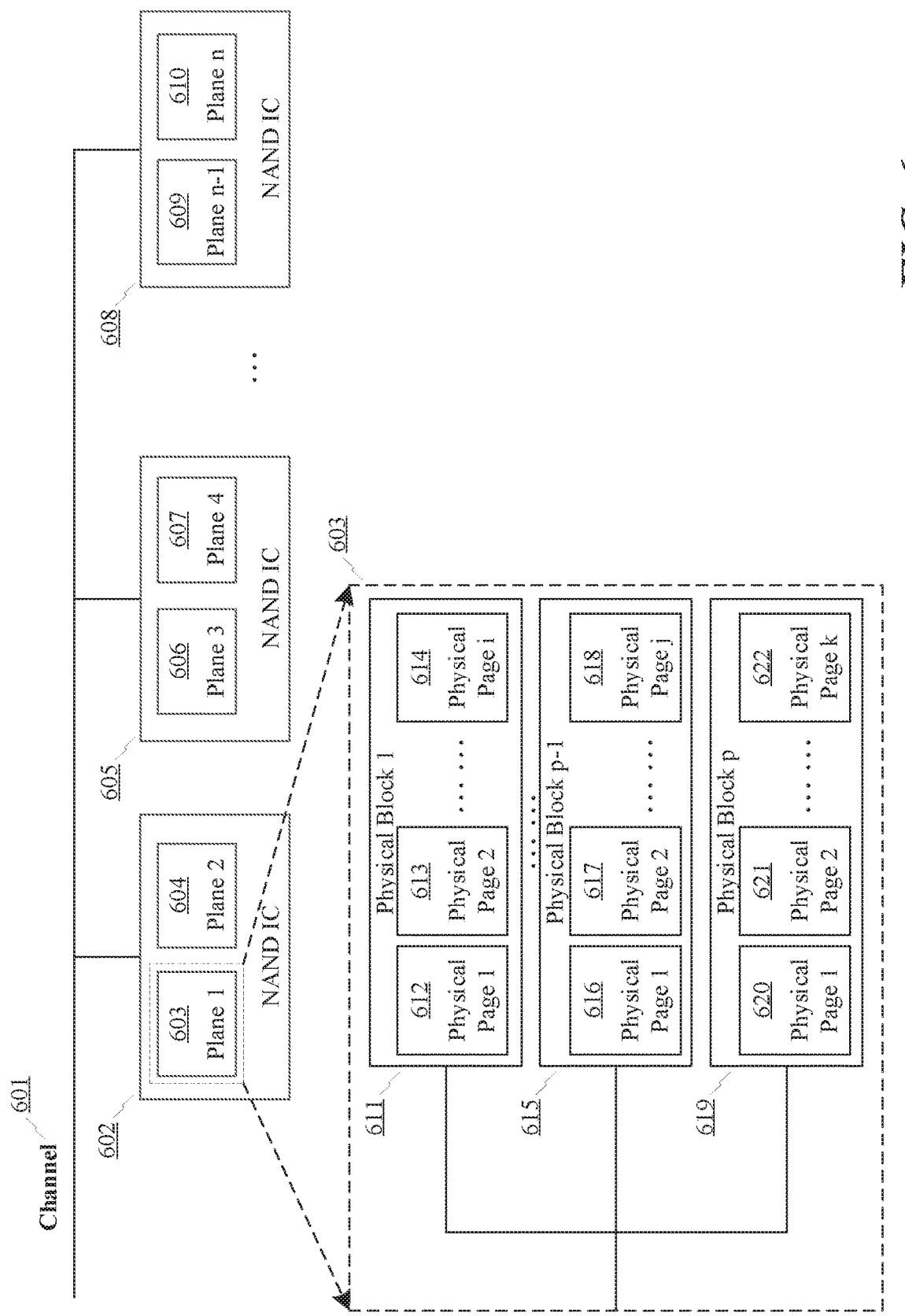
FIG. 6 is an alternative schematic of the internal NAND flash structure of an SSD, according to some embodiments of the present disclosure.

FIG. 6 is an alternative illustration of the internal NAND flash structure of an SSD. As stated above, a storage controller (e.g., storage controller 504 of FIG. 5) of an SSD is connected with one or more NAND flash integrated circuits (ICs), which are where any data received by the SSD is ultimately stored. Each NAND IC 602, 605, and 608 typically contains one or more planes. Using NAND IC 602 as an example, NAND IC 602 is composed of planes 603 and 604. As stated above, each plane is then composed of multiple physical blocks. For example, plane 603 is composed of physical blocks 611, 615, and 619. Each physical block is then further composed of physical pages, which, for physical block 611, are physical pages 612, 613, and 614.

The reason that SSD block is sometimes considered the physical block (fundamental unit) rather than an SSD page is that, to write to a previously written to SSD page, the SSD page must be erased (zeroed out) first. However, an individual SSD page cannot be erased; rather, the entire SSD block (meaning every SSD page in that block) must be erased. However, even a single SSD page is often much larger than the logical block size used by an OS/filesystem. Thus, whether one considers an SSD block to be a physical block or instead considers an SSD page to be a physical block, the large size of both means there is inefficiency. Even more problematic, one of the ways that SSDs increase their storage capacity (and density) is by increasing both the length of each SSD page (i.e., more strings per physical block) and by increasing the number of bits that can be stored on the transistors making up an SSD page. Both result in greater SSD page (and SSD block) sizes, further exacerbating the size difference between physical blocks and logical blocks.

To address these issues, the disclosed embodiments present methods of directly mapping between a file and the physical block the file is stored on. This simplifies the IO stack by reducing the number of mappings to only one, potentially halving the amount of metadata. This decreases the performance penalty of using two levels of mapping, reduces lost storage capacity and bandwidth from mismatched sizes between logical blocks and physical blocks, reduces the amount of DRAM used for access to the mapping of a file, and reduces the price of secondary storage units.

Figure 7:
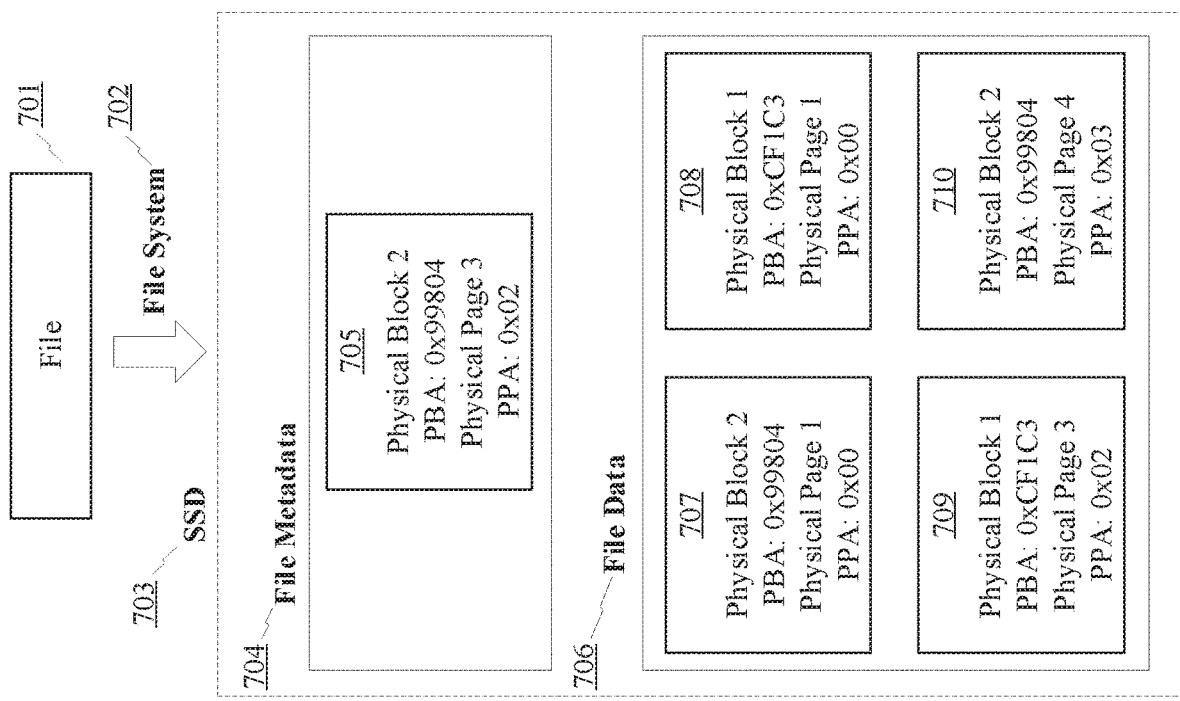
FIG. 7 illustrates a schematic diagram of an exemplary one-stage mapping of a file to a secondary storage unit (shown here as an SSD), according to some embodiments of the present disclosure.

FIG. 7 illustrates a schematic overview of the one-stage mapping performed by some of the disclosed embodiments. According to FIG. 7, file 701 is mapped by file system 702 directly to the physical pages of SSD 703, skipping the mapping to logical blocks performed by traditional file systems. Specifically, file 701 is mapped onto physical pages 705, 707, 708, 709, and 710. The file data 706 of file 701 is stored on physical pages 707, 708, 709, and 710. The metadata recording how file 701 maps to physical pages 707, 708, 709, and 710 is stored on physical page 705. The physical pages are divided into two groups: a data group 706 containing the data of file 701 and a metadata group 704 containing the metadata recording how the physical blocks of group 706 map to file 701. FIG. 7 also shows how each physical page is part of physical block, with the physical page having a physical page address (PPA) inside the physical block. The physical block in turn has a physical block address (PBA). Together the physical page address and physical block address uniquely identify a page. Taking physical page 707 as an example, physical page 707 could be identified as physical page 0x00 of physical block 0x99804.

Figure 8:
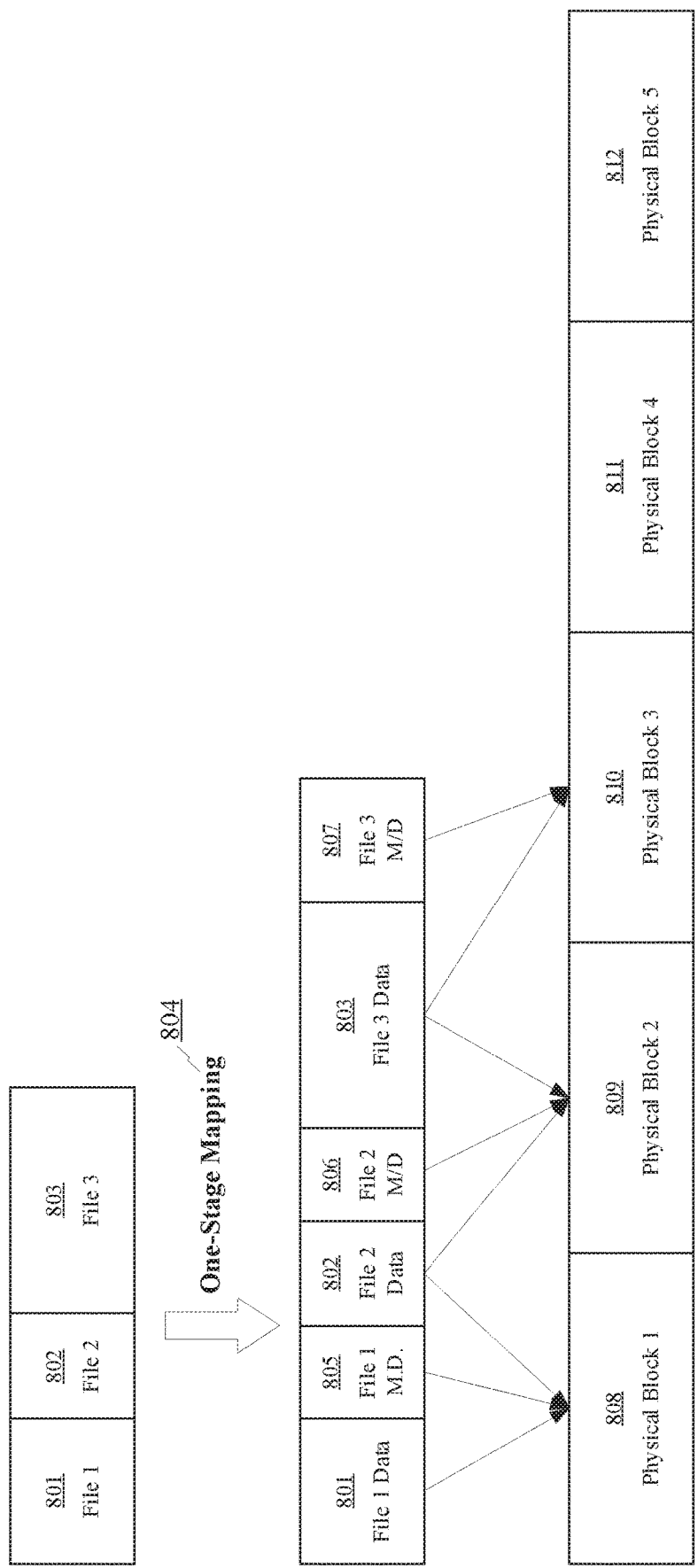
FIG. 8 illustrates how a one-stage mapping is more efficient in terms of storage utilization, according to some embodiments of the present disclosure.

FIG. 8 illustrates the greater data efficiency of a one-stage file mapping as compared to a two-stage mapping, shown earlier in FIG. 4. Because the one-stage mapping only uses metadata recording the mapping of file to physical block, more storage space is available for storing data, rather than metadata. Taking file 801 as an example, FIG. 8 shows that file 801 is mapped to physical block 808, that metadata (M/D) 805 recording this mapping is created, and that metadata 805 is then also mapped to physical block 808. In comparison to FIG. 4, the greater efficiency of the one-stage mapping 804 means that only three physical blocks, rather than 5, are used to store files 801, 802, and 803.

To enable this direct mapping, some of the embodiments of the present disclosure decide, by a device, to store a parcel of data. This may involve, for example, a user of the device creating a new file, such as by downloading a new video, or a user modifying an already existing file, such as by editing a research paper. The decision can also be prompted without user intervention, such as an application or service on the device automatically performing a function that generates data or the device automatically downloading a system update. After the device has made the decision to store some particular parcel of data, the device may then select which physical storage unit to store the parcel of data on. In some embodiments, selecting a physical storage unit can involve selecting from multiple secondary storage units, which could be SSDs, HDDs, magnetic tapes, or some other non-volatile storage media.

After the device has selected a secondary storage unit to store the parcel of data, the physical block size of the selected secondary storage unit is determined. This may involve directly analyzing the secondary storage unit, reading model information stored in the storage unit, consulting a local database listing device type (or other identifying information) and their corresponding physical block size, or accessing an internet resource that lists physical block size for particular models, serial numbers, or other identifying information.

After the physical block size is determined, the device may then segment the parcel of data into chunks of data. Each chunk of data, except for possibly one, has the same size as the determined physical block size for the secondary storage unit. Thus, unless the parcel of data (along with any metadata) is an exact integer multiple of the physical block size, there may be one incompletely filled data chunk, referred to as a partial data chunk. If the parcel of data is smaller than the physical block size, the partial data chunk may be the only data chunk. Otherwise, if the parcel of data is larger than the physical block size, there can be, in addition to the one partial data chunk, one or more data chunks that are filled, referred to as full data chunks.

After the parcel of data has been segmented, each of the full data chunks, if there are any, may then be written to a physical block of the secondary storage unit. The partial data chunk may be stored in a collection buffer. The collection buffer can hold unwritten partial data chunks until, collectively, the collected partial data chunks fill substantially all (e.g., more than 90%) of a physical-block-sized data chunk. After the collected partial data chunks substantially fill all of a physical-block-sized data chunk, the collected partial data chunks are then written to a physical block of the secondary storage unit, which can maximize the use of storage capacity, since writing multiple partial data chunks to a physical block substantially reduces the amount of space wasted if partial data chunks are not written with other partial data chunks.

In some embodiments, the device may be any one of the numerous types of electronic systems. For example, the device could be a server, a storage node in a datacenter, a desktop computer, a laptop computer, a tablet, a smartphone, a wearable device such as a smartwatch, an embedded device, an orbital satellite, or any other von-Neuman-architected computer possessing a secondary storage unit.

In some embodiments, the device may only have a single accessible secondary storage unit. In some other embodiments, the device may have multiple accessible secondary storage units. In either case, for some embodiments the accessible secondary storage units may be physically attached to the device, such as through a USB, Thunderbolt, InfiniBand, Fibre Channel, SAS, or SATA connections. In some embodiments, the accessible secondary storage units may not be physically attached to the device but instead are networked, meaning that the secondary storage units are accessible over the device's network connection. Examples include SANs, NASs, cloud storage, and using other device's as remote targets. Some embodiments may have accessible secondary storage units that are of both types, i.e., some secondary storage units may be physically attached, and some secondary storage units may be networked.

In some embodiments, the device may store the parcel of data across multiple attached secondary storage units. An example of when a parcel of data may be stored across multiple secondary storage units is if the parcel of data is stored on a logical drive that spans multiple secondary storage units. Some embodiments may accomplish storing a parcel of data across multiple secondary storage units by first dividing the parcel of data across the secondary storage units that the parcel of data is to be written to and then proceeding to segment each divided portion of the parcel of data for each secondary storage unit, as appropriate. When selecting which secondary storage units, and what number of them, to be selected, in some embodiments the device may make the determination based on various criteria, such as current or historical IO utilization of the secondary storage unit, performance characteristics such as READ or WRITE speed of the secondary storage unit, or capacity utilization of the secondary storage unit. The criteria may also consider characteristics of the data being stored, such as if the data is frequently or infrequently accessed. The rationale being that data that is more frequently accessed should be stored on faster, more powerful, better secondary storage units for performance reasons, and vice-versa.

In some embodiments, the group of secondary storage units selected could have different physical block sizes, which could lead to the parcel of data be segmented differently depending on secondary storage unit the parcel of data is being written to. For example, the group of selected secondary storage units could have different physical block sizes if some of the secondary storage units were SSDs and some were HDDs. SSDs usually have larger physical blocks than HDDs, and thus the data chunks a parcel of data was segmented into would be larger if the parcel of data was being stored on one of the SSD secondary storage units and smaller if the parcel of data was being stored on one of the HDD secondary storage units. Additionally, for some embodiments which write a parcel of data across multiple secondary storage units, the various subparts of the parcel of data may similarly be segmented into different sized data chunks depending on the secondary storage units each subpart is written to.

Additionally, in embodiments dividing the parcel of data across multiple secondary storage units, some embodiments may divide the data equally. Alternatively, some embodiments may divide the data unequally across the secondary storage units based on various criteria. The criteria used may be based on the characteristics of the selected secondary storage units, such as current or historical IO utilization of the secondary storage unit, performance characteristics such as READ or WRITE speed of the secondary storage unit, or capacity utilization of the secondary storage unit. The criteria may also consider characteristics of the data being stored, such as if the data is frequently or infrequently accessed. The overall goal being to divide the parcel of data across secondary storage units in such a way as to maximize the device's performance. The performance sought to be maximized may be the use of the secondary storage units' resources (in terms of both capacity and performance) along with maximizing the efficiency gained from controlling which secondary storage units the data parcel is stored to (e.g., data with numerous frequent reads go on a secondary storage unit with the best random read performance, data that is frequently written to go on the secondary storage unit with quick write speeds, data that is rarely accessed may be stored on slower secondary storage units).

In some embodiments, the full data chunks, or some subset of them, may not be immediately written after being segmented. Instead, the full data chunks may be retained in the primary storage unit (e.g., RAM), stored in a cache (e.g., memory accelerator unit), or stored in a buffer (e.g., DRAM module in secondary storage unit). One advantage of not immediately writing full data chunks is to allow the device to delay WRITING data in favor of attending to other IO requests, such as READ requests by system applications. Allowing the device to delay writing a full data chunk to prioritize other IO requests increases the response time of the device and increases resource utilization, since the WRITE operation can be deferred to times when the system otherwise has low resource utilization. Allowing this prioritization also allows the system to avoid writing data that may be shortly re-edited, providing a further increase to system efficiency.

In some embodiments, the process of segmenting the parcel of data into data chunks may proceed over a duration of time, rather than occurring simultaneously. In other words, some (full) data chunks may have been segmented from the parcel of data while the device is still segmenting other parts of the parcel of data. When some full data chunks have been segmented from the parcel of data while other parts remain to be segmented, some embodiments may begin writing the already segmented full data chunks without waiting for the entire segmentation process to complete. The full data chunks could also be temporarily stored, rather than immediately written. Being able to immediately begin writing would allow further efficiency since beginning to store full data chunks as they are segmented off from the data parcel can allow available IO bandwidth to be immediately used and allow the WRITE operations to be further spread out in time. Being able to store full data chunks as they become available would be especially useful for larger parcels of data (e.g., large files), since the segmentation operation would take correspondingly longer, for a fixed physical block size.

In some embodiments, not all partial data chunks being held in a collection buffer may be used to fill substantially all of a physical-block-sized data chunk. Thus, some embodiments may use only certain partial data chunks to fill substantially all of a physical-block-sized data chunk. What constitutes "substantially all" can vary from application to application, but typically would be around 90%. Only a subset of the partial data chunks may be used because the data buffer is holding more partial data chunks than can fit in one full data chunk. For example, if the data buffer is currently holding three partial data chunks that is 0.7, 0.8, and 0.15 of one full data chunk, respectively, all three data chunks could not be written to a single physical block. Having more partial data chunks that can fit in a single physical block can occur because a partial data chunk's size (in terms of full data chunks) can be anywhere in the range (0.0 full data chunk size, 0.9 full data chunk size). Thus, a data chunk may need to wait until sufficiently small data chunks are stored that can be added to make their combined total fill substantially of a full data chunk without exceeding the size of a full data chunk.

Thus, a partial data chunk in the queue may wait until it can be paired with one or more data chunks whose combined size is ≥0.9 full data chunk size but is ≤1.0 full data chunk size. In some embodiments, the stored data chunks may be treated like a queue, with those data chunks that have been stored the longest being given priority in combining data chunks to achieve the above size criteria. As a practical matter, the greater the size of a stored partial data chunk (in term of a full data chunk), the fewer other stored partial data chunks there are that the first stored partial data chunk can be combined with without exceeding the size of one full data chunk. Thus, larger stored partial data chunks may, on average, wait longer than smaller stored partial data chunks.

To keep track of which partial data chunk belongs to which file when multiple partial data chunks are written to the same physical block (or the same physical page, when referring to SSDs), some embodiments may retain metadata recording the length and offset into the physical block of a particular file's partial data chunk. Additionally, some embodiments may employ a header and footer scheme to separate and track the partial data chunks in a particular physical block (or physical page, for an SSD). Using a header and footer scheme, each partial data chunk written to a physical block is proceeded by a header and followed by a footer. The header and footer use a unique pattern (in a given block) for each partial data chunk, in addition to error correction coding, to ensure the header and footer, and the partial data chunk they correspond to, can be recognized. The header for each partial data chunk contains the index of the partial data chunk stored in the physical block. In the metadata for the mapping from a parcel of data to the appropriate physical block, the physical block address (or physical page address for SSDs) and the index of the parcel of data—e.g., whether the parcel is the first, second, third, or nth file stored in the physical block, in sequential order—are both recorded.

In embodiments using the header and footer scheme just described, reading a partial data chunk corresponding to a parcel of data may be accomplished as follows. First, the system looks up the parcel of data's metadata to determine the physical block address of the partial data chunk and the index of the partial data chunk in that physical block. To find the partial data chunk's entry in the metadata, it's hash value can be used as entry. The hash is strong enough to allow a very low likelihood of collision, allowing address mapping with low latency. The system can read the entire contents of the physical block, use the index and the header and footers to find the requested partial data chunk, and then drops the rest of the page the system read.

Figure 9:
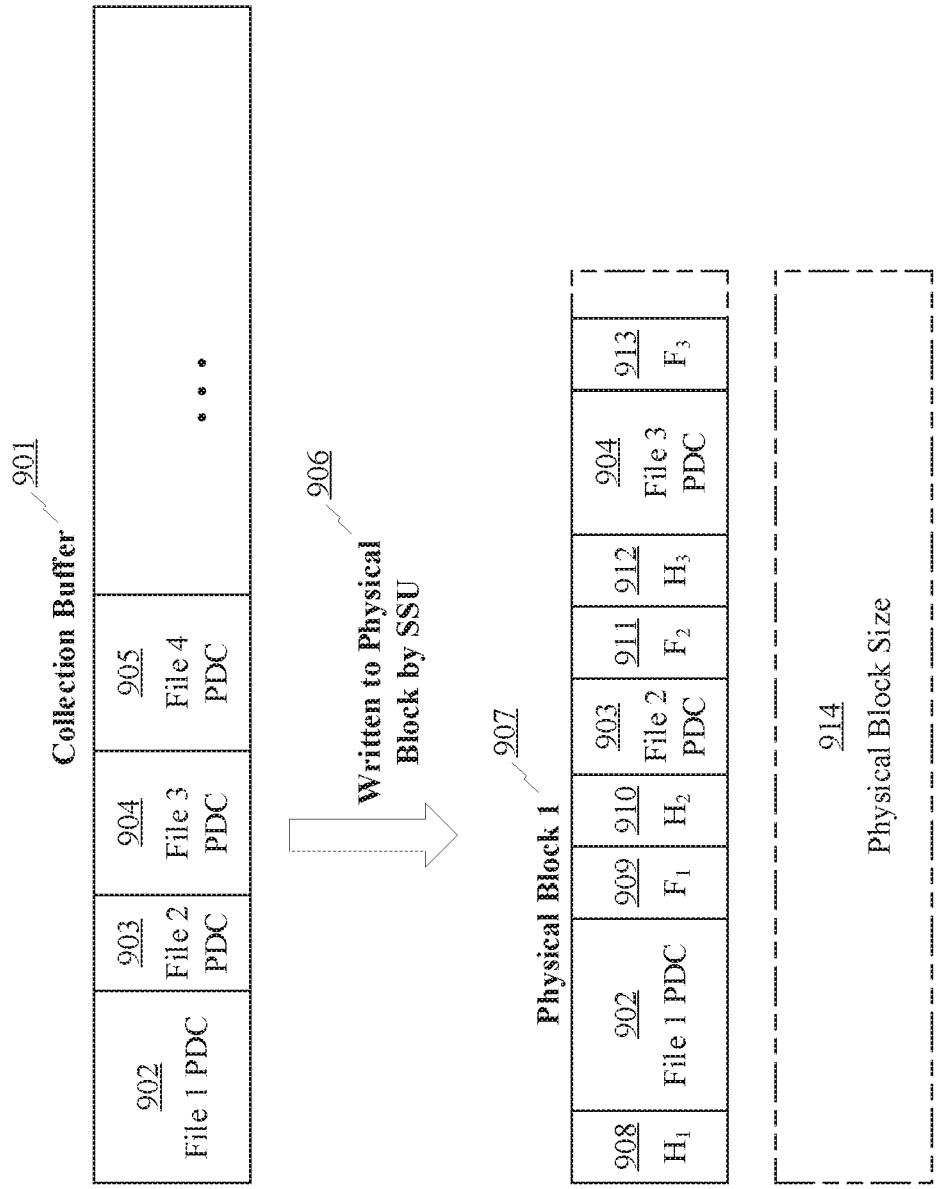
FIG. 9 is a schematic diagram illustrating an efficient meta data scheme utilizing headers and footers, according to some embodiments of the present disclosure.

FIG. 9 is a schematic diagram illustrating the header and footing scheme just described. As shown by FIG. 9, partial data chunks (PDCs) 902, 903, 904, and 905 are collected in collection buffer 901. When the combined size of some subset of the collected partial data chunks (taking into account the size of the metadata, e.g. their header and footer) substantially fill a physical block size 914 of secondary storage unit (SSU) 906, the subset of partial data chunks are then written to a physical block. Here, partial data chunks 902, 903, and 904 are selected and, together with their corresponding metadata, e.g., headers and footers, partial data chunks 902, 903, and 904 fill substantially all of a physical block. Partial data chunks 902, 903, and 904 are then written to physical block 907. When the partial data chunks are written to the physical block, a header is first written, followed by the corresponding partial data chunk being written immediately after, and then followed by a footer being written after the partial data chunk. Using the first partial data chunk to be written, partial data chunk 902, as an example, first a header 908 unique to partial data chunk 902 is written. Partial data chunk 902 is then written immediately after header 908. A footer 909 unique to partial data chunk 902 is then written after partial data chunk 902.

Some embodiments may employ various, possibly complex strategies to determine what partial data chunks should be combined and stored. Some embodiments could employ strategies that do not use a combined stored partial data chunks, even if the combination of those partial data chunks would fill substantially all of a full data chunk. The rationale could be that it would be more efficient to "save" one of these data chunks for later (such as not using a very small partial data chunk, since a very small partial data chunk can be combined with a very large partial data chunk, which has a more difficult time finding a matching pair).

In some embodiments, exceptional events may exist where the partial data chunks in a collection buffer are written to a physical block even if the partial data chunks do not fill substantially all of a full data chunk. An example of such an exceptional event would be a loss of power, since the buffer is almost certainly volatile and thus would lose any data if the buffer lost power. The content of the data buffer would thus be protected by the usual power loss protection of the secondary storage unit and, in the event the secondary storage unit lost power, the data in the buffer can be written to a physical block using the residual power, with any non-used space being written to with random data. Another example where data is written early would be if there was a timer on how long data could be held in the buffer and the timer timed out. Still another example would be requiring data to be written early in response to a command by the OS to flush the buffer.

Figure 10:
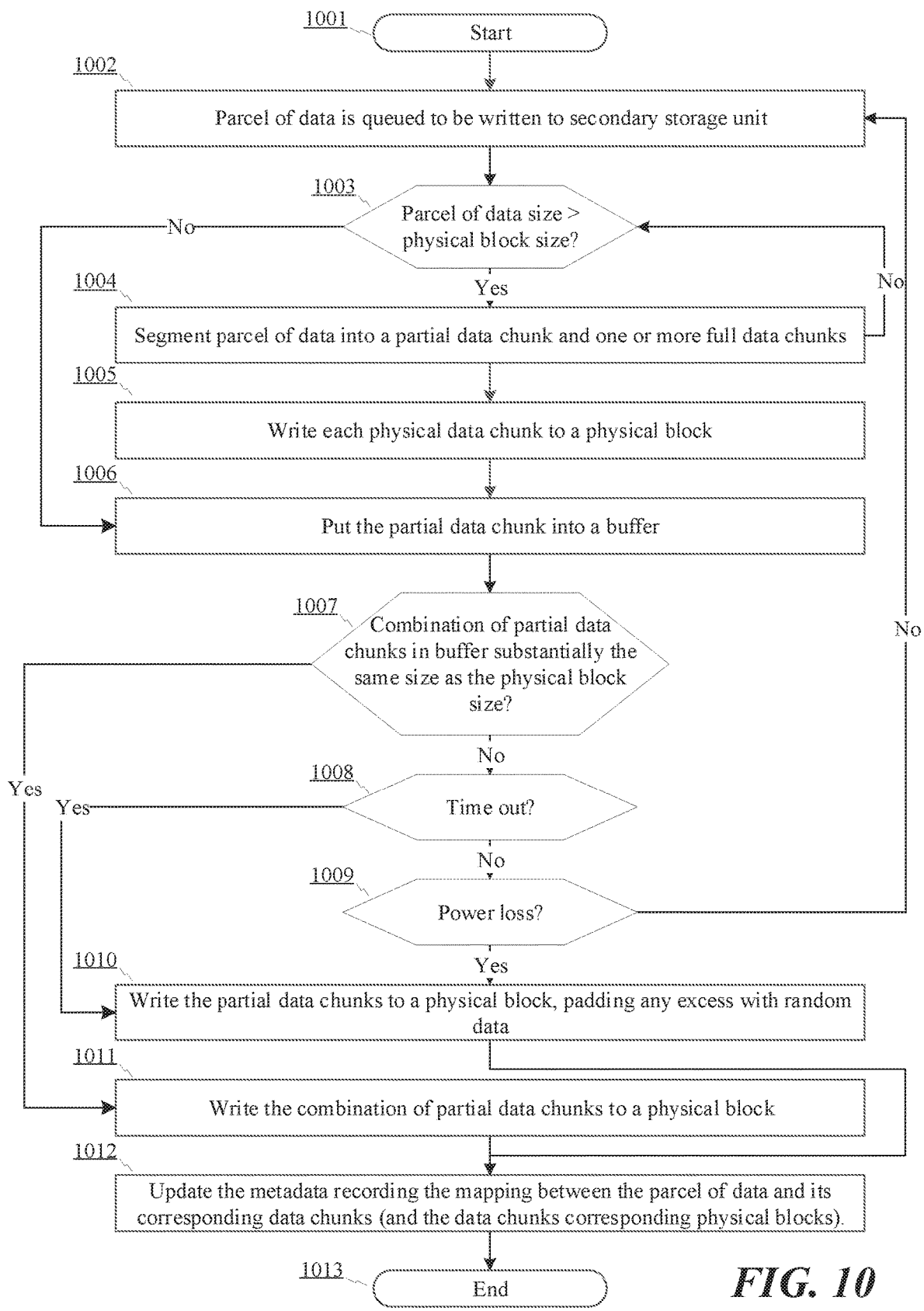
FIG. 10 is a flowchart demonstrating the handling of an exceptional event, according to some embodiments of the present disclosure.

FIG. 10 is a flowchart an exemplary method for how a host system could perform a one stage mapping, consistent with some embodiments of the present disclosure. In particular FIG. 10 shows how a parcel of data, such as a file, may be partitioned into multiple data chunks, and how these data chunks may be written to a physical block, both in ordinary operation and in the event of an exceptional event. A parcel of data may be divided into full data chunks, which are the size of the physical block size of the secondary storage unit being written to, which may be written immediately. The remainder of the partial data chunk that is smaller than the physical block size, called the remainder data chunk, may be held in a collection buffer with other partial data chunks. After the remainder data chunk and some subset of other remainder data chunks fill substantially all of a physical block, the remainder data chunk and subset of other data chunks may be written to a physical block of the secondary storage unit. Alternatively, the partial data chunk could be written to a physical block in response to an exceptional event.

As shown by FIG. 10, in step 1002, a parcel of data is first queued to be written to a secondary storage unit. In step 1003, it is determined whether the parcel of data is larger than a physical block size of the secondary storage unit. If the parcel of data is larger than the physical block size, the parcel of data is segmented in step 1004 into one or more full data chunks with any remainder being a partial data chunk (which is necessarily less than or equal to a physical block size). The full data chunks are then written to a physical block in step 1005. In step 1006, the partial data chunk is stored in a buffer and the method proceeds to step 1007. On the other hand, if at step 1003 the parcel of data is less than the physical block size, the parcel of data is stored as a partial data chunk in a buffer in step 1006. The method then proceeds to step 1007.

In step 1007, it is determined if the partial data chunk, along with some subset of other partial data chunks stored in the same buffer, together fill substantially all of a physical block size. If the partial data chunk and some subset of other partial data chunks do fill substantially all of a physical block size, in step 1011 the partial data chunks are written to a physical block of the secondary storage unit, and the method proceeds to step 1012.

If the partial data chunk and some subset of other partial data chunks do not fill substantially all of a physical block size, in step 1008 it is determined if there has been a time out and in step 1009 it is determined if there has been a loss of power. If neither of the tests in steps 1008 and 1009 are positive, the flowchart repeats with step 1002. If one of the tests in steps 1008 and 1009 is positive, however, in step 1010 the partial data chunk, along with any other partial data chunks, are immediately written to physical blocks, with any unused space being padded with random data, and the method proceeds to step 1012. Finally, in step 1012, the metadata recording the mapping between the parcel of data and its corresponding data chunks is updated.

Some embodiments may employ a timer limiting how long a partial data chunk may remain in the buffer before the partial data chunk is written to a physical block. For example, the length of time a partial data chunk remains in a buffer could be limited by storing every partial data chunk with metadata that records when the partial data chunk was stored in the buffer. The system could then periodically review the metadata recording when the partial data chunk was stored to ensure the partial data chunk has not exceeded the time limitation. Another example would be setting a specific value in the metadata and then decrementing periodically, writing the partial data chunk, if not already written, when the value reaches zero. Still other embodiments may base the limit not on elapsed time, but on other metrics, such as amount of data written or amount of partial data chunks stored. Limiting how long a partial data chunk may remain in a buffer can ensure the system does not exhibit pathological behavior and allow partial data chunks to continuously accumulate in the buffer, reducing system performance.

In some embodiments, there may be multiple buffers being utilized to store partial data chunks. In some embodiments, there may be multiple buffers being utilized for individual secondary storage units. The use of multiple buffers may increase performance of the system by reducing bottlenecks that may result from concurrent processes competing for access to buffers. In embodiments utilizing multiple buffers, the system may choose which buffer to store a particular partial data chunk in based on a variety of factors. These factors include the current number of partial data chunks stored in each buffer, the current size of total partial data chunks stored in each buffer, the average size of partial data chunks stored in each buffer, the current or historical usage of each buffer, and the current or historical wait time for partial data chunks in each buffer.

Additionally, in some embodiments the buffer may be a part of the system, such as a specialized cache or designated portion of the system's primary storage (e.g., RAM). In other embodiments, the buffer may be part of the secondary storage unit. In embodiments utilizing multiple data buffers, the system may use a mix of buffers, with some buffers being part of the system and some buffers being part of (one or more of) the secondary store unit.

In some embodiments, a non-transitory computer-readable storage medium including instructions is also provided, and the instructions may be executed by a device (such as a host system), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The host system, operating system, file system, and other functional units described in this disclosure can be implemented by hardware, or software, or a combination of hardware and software. One of ordinary skill in the art will also understand that multiple ones of the above described functional units may be combined as one functional unit, and each of the above described functional units may be further divided into a plurality of functional sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for storing data in a secondary storage unit, the method comprising:
    segmenting a parcel of data into one or more data chunks according to a physical block size of the secondary storage unit, wherein the one or more data chunks include a partial data chunk and zero or more full data chunks;
    sending each full data chunk of the zero or more full data chunks to the secondary storage unit to be written to a selected physical block of the secondary storage unit;
    collecting, in a collection buffer, the current partial data chunk and at least another partial data chunk;
    sending a combination of the current partial data chunk and a subset of the plurality of other partial data chunks to the secondary storage unit to be written to a selected physical block of the secondary storage unit, wherein said combination fills substantially all of a physical-block-sized data chunk; and
    recording, for the parcel of data, metadata that directly maps the parcel of data and the physical blocks where the parcel of data's data chunks were written without mapping the parcel of data to logical blocks.

2. The method of claim 1, further comprising:
    segmenting the parcel of data into two or more sub-parcels; and
    selecting two or more secondary storage units to store the sub-parcels of data on.

3. The method of claim 1, wherein the secondary storage units are selected on the basis of:
    current or historical IO utilization of the secondary storage unit,
    current or historical capacity utilization of the secondary storage unit,
    performance characteristics of the secondary storage unit, or
    characteristics of the parcel of data.

4. The method of claim 1, wherein the metadata includes physical block addresses for the physical block where the parcel of data's data chunks were written and indexes of the parcel of data's data chunks in each of the physical blocks.

5. The method of claim 4, wherein:
    each written data chunk starts with a header and ends with a footer;
    the header and footer are unique within their respective data chunk; and
    the header marks the index of the data chunk.

6. The method of claim 1, further comprising sending the partial data chunks collected in the collection buffer to the secondary storage unit to be written to selected physical blocks of the secondary storage unit in response to an exceptional event.

7. The method of claim 6, wherein the exceptional event is one of a loss of power, a time out of a timer, or a command to flush the collection buffer.

8. A non-transitory computer readable medium that stores a set of instructions that is executable by at least one processor of a computer system to cause the computer system to perform a method for storing data in a secondary storage unit, the method comprising:
    segmenting a parcel of data into one or more data chunks according to a physical block size of the secondary storage unit, wherein the one or more data chunks include a partial data chunk and zero or more full data chunks;
    sending each full data chunk of the zero or more full data chunks to the secondary storage unit to be written to a selected physical block of the secondary storage unit;
    collecting, in a collection buffer, the current partial data chunk and at least another partial data chunk;
    sending a combination of the current partial data chunk and a subset of the plurality of other partial data chunks to the secondary storage unit to be written to a selected physical block of the secondary storage unit, wherein said combination fills substantially all of a physical-block-sized data chunk; and
    recording, for the parcel of data, metadata that directly maps the parcel of data and the physical blocks where the parcel of data's data chunks were written without mapping the parcel of data to logical blocks.

9. The non-transitory computer readable medium of claim 8, wherein the secondary storage units are selected on the basis of:
    current or historical IO utilization of the secondary storage unit,
    current or historical capacity utilization of the secondary storage unit,
    performance characteristics of the secondary storage unit, or
    characteristics of the parcel of data.

10. The non-transitory computer readable medium of claim 8, wherein the metadata includes physical block addresses for the physical block where the parcel of data's data chunks were written and indexes of the parcel of data's data chunks in each of the physical blocks.

11. The non-transitory computer readable medium of claim 10, wherein:
    each written data chunk starts with a header and ends with a footer;
    the header and footer are unique within their respective data chunk; and
    the header marks the index of the data chunk.

12. The non-transitory computer readable medium of claim 8, wherein the set of instructions is executable by the at least one processor of the computer system to cause the computer system to further perform sending the partial data chunks collected in the collection buffer to the secondary storage unit to be written to selected physical blocks of the secondary storage unit in response to an exceptional event.

13. A system for storing data in a secondary storage unit, comprising:

a memory storing a set of instructions; and
one or more processors configured to execute the set of instructions to cause the system to perform:
  segmenting a parcel of data into one or more data chunks according to a physical block size of the secondary storage unit, wherein the one or more data chunks include a partial data chunk and zero or more full data chunks;
  sending each full data chunk of the zero or more full data chunks to the secondary storage unit to be written to a selected physical block of the secondary storage unit;
  collecting, in a collection buffer, the current partial data chunk and at least another partial data chunk;
  sending a combination of the current partial data chunk and a subset of the plurality of other partial data chunks to the secondary storage unit to be written to a selected physical block of the secondary storage unit, wherein said combination fills substantially all of a physical-block-sized data chunk; and
  recording, for the parcel of data, metadata that directly maps the parcel of data and the physical blocks where the parcel of data's data chunks were written without mapping the parcel of data to logical blocks.

14. The system of claim 13, wherein the secondary storage units are selected on the basis of:
  current or historical IO utilization of the secondary storage unit,
  current or historical capacity utilization of the secondary storage unit,
  performance characteristics of the secondary storage unit, or
  characteristics of the parcel of data.

15. The system of claim 13, wherein the metadata includes physical block addresses for the physical block where the parcel of data's data chunks were written and indexes of the parcel of data's data chunks in each of the physical blocks.

16. The system of claim 15, wherein:
  each written data chunk starts with a header and ends with a footer;
  the header and footer are unique within their respective data chunk; and
  the header marks the index of the data chunk.

17. The system of claim 13, wherein the one or more processors are configured to execute the set of instructions to cause the system to further perform sending the partial data chunks collected in the collection buffer to the secondary storage unit to be written to selected physical blocks of the secondary storage unit in response to an exceptional event.

18. A system comprising:
a host device; and
a secondary storage unit communicatively coupled to the host device, wherein
  the host device is configured to:
    segment a parcel of data into one or more data chunks according to a physical block size of the secondary storage unit, wherein the one or more data chunks include a partial data chunk and zero or more full data chunks,
    send each full data chunk of the zero or more full data chunks to the secondary storage unit to be written to a selected physical block of the secondary storage unit,
    collect, in a collection buffer, the current partial data chunk and at least another partial data chunk, send a combination of the current partial data chunk and a subset of the plurality of other partial data chunks to the secondary storage unit to be written to a selected physical block of the secondary storage unit, wherein said combination fills substantially all of a physical-block-sized data chunk, and
    record, for the parcel of data, metadata that directly maps the parcel of data and the physical blocks where the parcel of data's data chunks were written without mapping the parcel of data to logical blocks; and
  the secondary storage unit is configured to:
    write each received full data chunk of the zero or more full data chunks to the selected physical block of the secondary storage unit,
    write the combination of the current partial data chunk and the subset of the plurality of other partial data chunks to the selected physical block of the secondary storage unit.

* * * * *